(12) United States Patent
Huang et al.

(10) Patent No.: US 11,057,248 B2
(45) Date of Patent: Jul. 6, 2021

(54) BASEBAND SYSTEM FOR A WIRELESS RECEIVER AND BASEBAND SIGNAL PROCESSING METHOD THEREOF

(71) Applicant: NATIONAL CHIAO TUNG UNIVERSITY, Hsinchu (TW)

(72) Inventors: Zheng-Chun Huang, Taipei (TW); Wei-Che Lee, Taoyuan (TW); Hung-Chih Liu, Zhunan Township (TW); Chih-Wei Jen, New Taipei (TW); Shyh-Jye Jou, Baoshan Township (TW); Yu-Hwai Tseng, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/894,919

(22) Filed: Jun. 8, 2020

(65) Prior Publication Data
US 2021/0119837 A1 Apr. 22, 2021

(30) Foreign Application Priority Data
Oct. 16, 2019 (TW) ................................. 108137212

(51) Int. Cl.
*H04L 25/06* (2006.01)
*H04B 1/16* (2006.01)
(Continued)

(52) U.S. Cl.
CPC ............... *H04L 25/06* (2013.01); *H04B 1/16* (2013.01); *H04L 25/0212* (2013.01);
(Continued)

(58) Field of Classification Search
CPC . H04L 25/06; H04L 25/0212; H04L 25/0244; H04L 25/03006;
(Continued)

(56) References Cited

U.S. PATENT DOCUMENTS 7,174,146 B2 2/2007 Wu et al.
8,295,845 B1 10/2012 Abdollahi-Alibeik et al.
(Continued)

FOREIGN PATENT DOCUMENTS

TW 200524299 A 7/2005
TW 200536313 A 11/2005
(Continued)

OTHER PUBLICATIONS

C. Zhang, Z. Xiao, B. Gao, L. Su, and D. Jin, "Robust IQ imbalance estimation and compensation via specific preamble for 60 GHz systems," IEEE Wirel. Commun. Netw. Conf. WCNC, No. 1, pp. 4134-4139, 2013.
(Continued)

*Primary Examiner* — Vineeta S Panwalkar
(74) *Attorney, Agent, or Firm* — Meunier Carlin & Curfman LLC

(57) ABSTRACT

A baseband system includes: an estimation and compensation circuit estimating frequency-independent non-ideal effects based on an original IQ signal pair, and compensating the original IQ signal pair based on a result of the estimation to obtain a compensated IQ signal pair; a channel estimation and equalization circuit performing channel estimation and equalization based on the compensated IQ signal pair to obtain an equalized IQ signal pair; and a tracking and compensation circuit obtaining a result of tracking of residual quantities of the aforesaid non-ideal effects based on the equalized IQ signal pair, and compensating the equalized IQ signal pair based on the result of the tracking to obtain an output IQ signal pair.

13 Claims, 7 Drawing Sheets

(51) Int. Cl.
  *H04L 25/02* (2006.01)
  *H04L 25/03* (2006.01)
(52) U.S. Cl.
  CPC .... *H04L 25/0244* (2013.01); *H04L 25/03006* (2013.01); *H04L 2025/03356* (2013.01); *H04L 2025/03541* (2013.01)
(58) Field of Classification Search
  CPC ........... H04L 2025/03356; H04L 2025/03541; H04B 1/16
  See application file for complete search history.

(56) References Cited

U.S. PATENT DOCUMENTS

| | | | |
|---|---|---|---|
| 8,428,180 B1* | 4/2013 | Wolf | H04L 27/368 |
| | | | 375/296 |
| 2010/0198540 A1* | 8/2010 | Yanagisawa | H04L 27/364 |
| | | | 702/71 |
| 2010/0215125 A1* | 8/2010 | Furman | H04L 27/3863 |
| | | | 375/319 |
| 2015/0195050 A1* | 7/2015 | Kim | H04B 17/14 |
| | | | 375/221 |

FOREIGN PATENT DOCUMENTS

| | | |
|---|---|---|
| TW | 200616371 A | 5/2006 |
| TW | 200633418 A | 9/2006 |
| TW | 201242309 A | 10/2012 |
| TW | 201442471 A | 11/2014 |

OTHER PUBLICATIONS

L. Chen, Z. Luo, X. Cheng, and S.Li, "Golay sequence based time-domain compensation of frequency-dependent I/Q imbalance," China Commun., vol. 11, No. 6, pp. 1-11, 2014.

\* cited by examiner

BASEBAND SYSTEM FOR A WIRELESS RECEIVER AND BASEBAND SIGNAL PROCESSING METHOD THEREOF

CROSS-REFERENCE TO RELATED APPLICATION

This application claims priority of Taiwanese Patent Application No. 108137212, filed on Oct. 16, 2019, the contents of which are incorporated herein by reference.

FIELD

The disclosure relates to wireless receiving techniques, and more particularly to a baseband system for a wireless receiver and a baseband signal processing method thereof.

BACKGROUND

In a wireless communication system, data received by a receiver from a transmitter may be erroneously demodulated because of in-phase and quadrature-phase (IQ) mismatch of each of the transmitter and the receiver. The causes of the IQ mismatch are contributed by: (a) a phase difference between an in-phase oscillation signal and a quadrature-phase oscillation signal that are outputted by a local oscillator is inaccurate, i.e., the phase difference is not exactly 90°, making a phase difference between signals that respectively transmit on an in-phase path and a quadrature-phase path inaccurate; and (b) component mismatches between the in-phase path and the quadrature-phase path, e.g., mixers that are respectively on these paths have different gains while filters that are respectively on these paths have difference gains, making the signals that respectively transmit on these paths have different amplitudes.

The problem of the inaccurate phase difference between the signals that respectively transmit on the in-phase path and the quadrature-phase path can be solved at a radio frequency (RF) circuit of each of the transmitter and the receiver. However, because of gain/phase imbalance of the RF circuit, a deviation of the phase difference from 90° cannot be correctly calculated, resulting in poor reception performance.

Another way to solve the problem of the inaccurate phase difference is to perform a calibration procedure after the wireless communication system is powered on. In the calibration procedure, the transmitter is configured to transmit calibration data on the in-phase path and the quadrature-phase path, and to change the deviation of the phase difference from 90° multiple times; output of the receiver is monitored; and the deviation of the phase difference from 90° due to gain/phase mismatch of each of the transmitter and the receiver is determined based on the output of the receiver. However, it takes a lot of time to perform the calibration procedure.

SUMMARY

Therefore, an object of the disclosure is to provide a baseband system for a wireless receiver and a baseband signal processing method thereof. The baseband system and the baseband signal processing method can alleviate the drawbacks of the prior arts.

According to an aspect of the disclosure, the baseband system is to be used in a wireless receiver for processing an original in-phase and quadrature-phase (IQ) signal pair that contains first sequence information, second sequence information and multiple pieces of third sequence information. The baseband system includes an estimation and compensation circuit, a channel estimation and equalization circuit and a tracking and compensation circuit. The estimation and compensation circuit is for receiving the original IQ signal pair, estimates frequency-independent non-ideal effects based on the first and second sequence information of the original IQ signal pair, and compensates the original IQ signal pair based on a result of the estimation to obtain a compensated IQ signal pair. The channel estimation and equalization circuit is coupled to the estimation and compensation circuit for receiving the compensated IQ signal pair therefrom, and performs channel estimation and equalization based on the compensated IQ signal pair to obtain an equalized IQ signal pair. The tracking and compensation circuit is coupled to the channel estimation and equalization circuit for receiving the equalized IQ signal pair therefrom, obtains a result of tracking of residual quantities of the frequency-independent non-ideal effects based on a portion of the equalized IQ signal pair that corresponds to the third sequence information, and compensates the equalized IQ signal pair based on the result of the tracking to obtain an output IQ signal pair.

According to another aspect of the disclosure, the baseband signal processing method is to be implemented by a baseband system of a wireless receiver for processing an original IQ signal pair that contains first sequence information, second sequence information and multiple pieces of third sequence information. The baseband signal processing method includes: estimating frequency-independent non-ideal effects based on the first and second sequence information of the original IQ signal pair, and compensating the original IQ signal pair based on a result of the estimation to obtain a compensated IQ signal pair; performing channel estimation and equalization based on the compensated IQ signal pair to obtain an equalized IQ signal pair; and obtaining a result of tracking of residual quantities of the frequency-independent non-ideal effects based on a portion of the equalized IQ signal pair that corresponds to the third sequence information, and compensating the equalized IQ signal pair based on the result of the tracking to obtain an output IQ signal pair.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
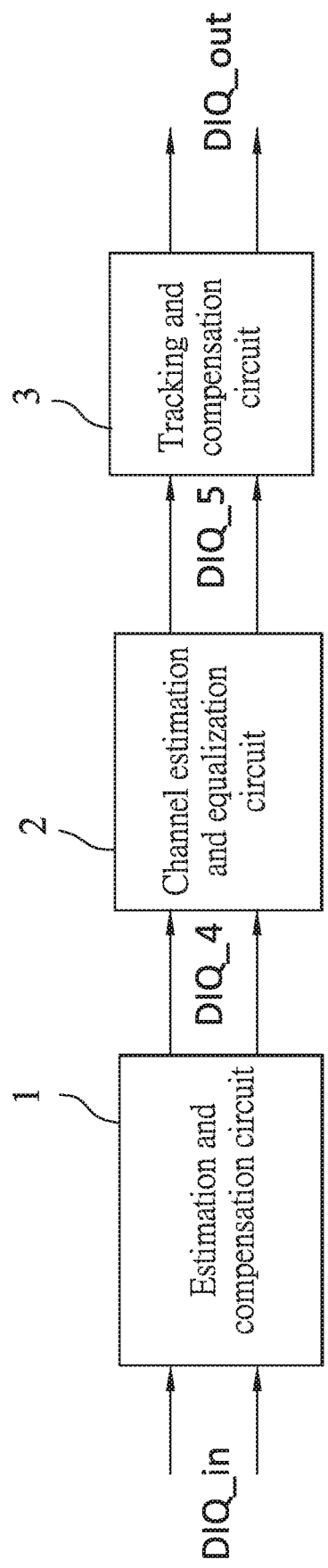
FIG. 1 is a block diagram illustrating an embodiment of a baseband system according to the disclosure.

Referring to FIG. 1, an embodiment of a baseband system according to the disclosure is to be used in a wireless receiver (not shown) that is operatively associated with a wireless transmitter (not shown). The baseband system of this embodiment is for receiving an original in-phase and quadrature-phase (IQ) signal pair (DIQ_in) from front end circuitry (including a radio frequency and analog front end circuit and a digital circuit) of the wireless receiver, and processes the original IQ signal pair (DIQ_in) to generate an output IQ signal pair (DIQ_out). The baseband system of this embodiment includes an estimation and compensation circuit 1, a channel estimation and equalization circuit 2 and a tracking and compensation circuit 3.

Figure 2:
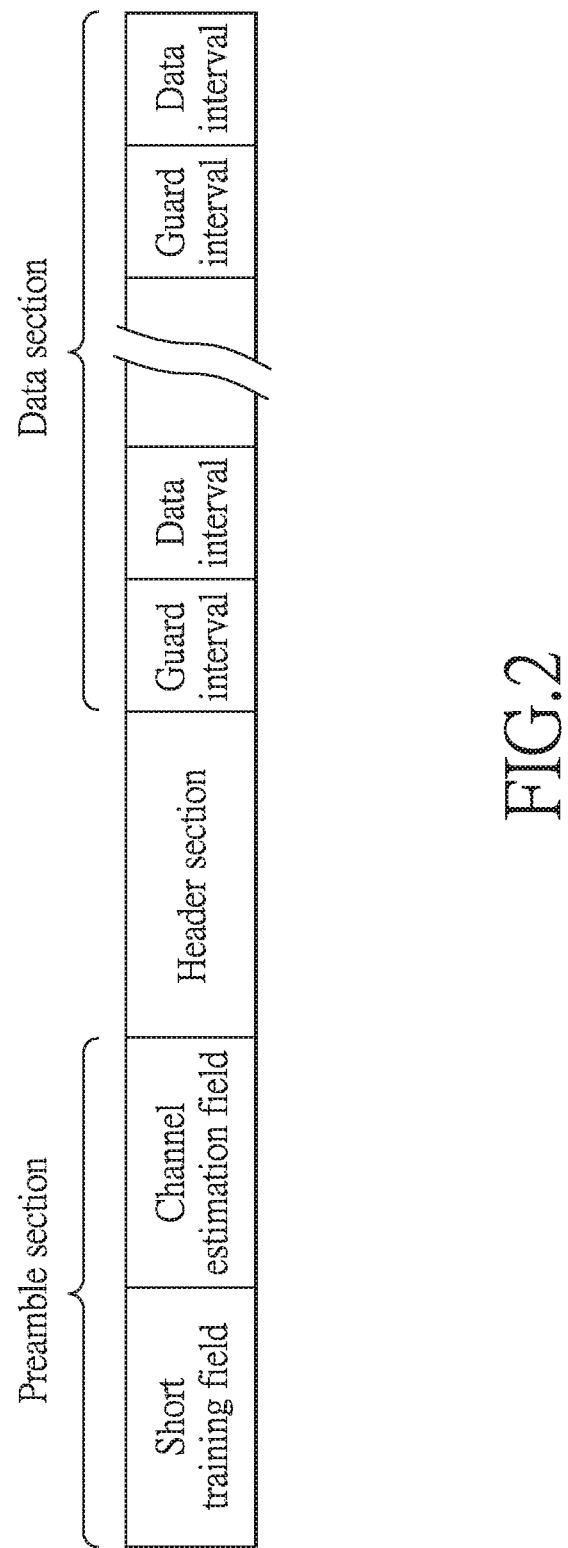
FIG. 2 is a schematic diagram illustrating a frame of an original in-phase and quadrature-phase (IQ) signal pair of the embodiment.

Referring to FIG. 2, in this embodiment, a frame of the original IQ signal pair (DIQ_in) complies with IEEE 802.11ad single carrier frame format, and includes a preamble section, a header section and a data section that are sequentially arranged in time. The preamble section includes a short training field and a channel estimation field. The short training field contains a plurality of sequences, each of which has Golay code characteristics. The channel estimation field contains a plurality of sequences, which have different lengths, and each of which has Golay code characteristics. The data section includes a plurality of combinations of a guard interval and a data interval. Each guard interval contains a sequence having Golay code characteristics. Each data interval contains data. For illustration convenience, hereinafter, the sequences contained in a first half of the short training field are collectively referred to as first sequence information, the sequences contained in a second half of the short training field are collectively referred to as second sequence information, the sequence contained in each guard interval is referred to as third sequence information, and the sequences contained in the channel estimation field are collectively referred to as fourth sequence information.

Figure 3:
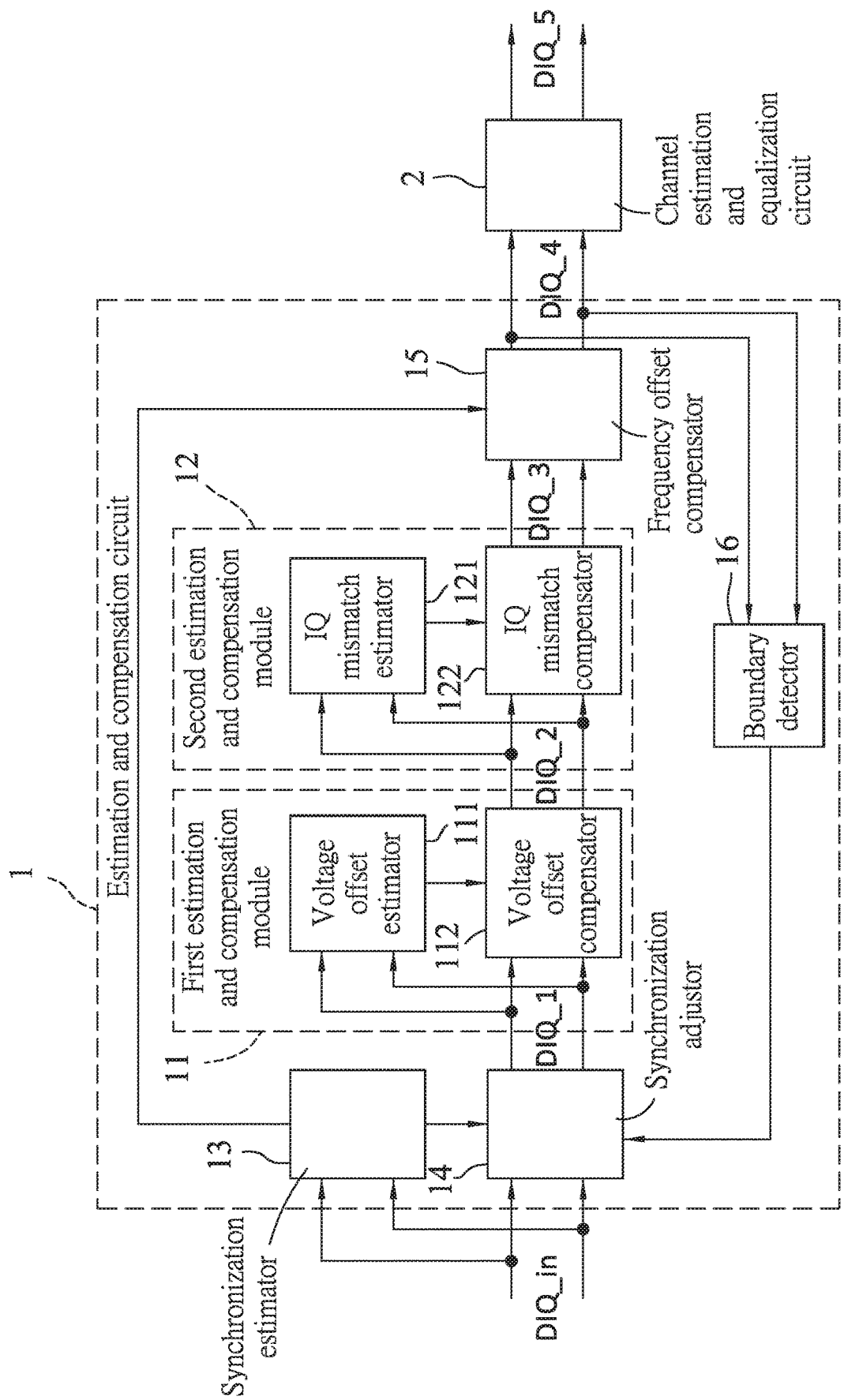
FIG. 3 is a block diagram illustrating an estimation and compensation circuit of the embodiment.

Referring to FIG. 3, the estimation and compensation circuit 1 is for receiving the original IQ signal pair (DIQ_in), estimates frequency-independent non-ideal effects (including direct current (DC) voltage offset and frequency-independent IQ mismatch of the wireless receiver) based on the first and second sequence information of the original IQ signal pair (DIQ_in), and compensates the original IQ signal pair (DIQ_in) based on a result of the estimation to obtain a compensated IQ signal pair (DIQ_4).

In this embodiment, the estimation and compensation circuit 1 includes a first estimation and compensation module 11, a second estimation and compensation module 12, a synchronization estimator 13, a synchronization adjustor 14, a frequency offset compensator 15 and a boundary detector 16. The first estimation and compensation module 11 includes a voltage offset estimator 111 and a voltage offset compensator 112. The second estimation and compensation module 12 includes an IQ mismatch estimator 121 and an IQ mismatch compensator 122.

The synchronization estimator 13 is for receiving the original IQ signal pair (DIQ_in), and estimates sampling frequency offset and carrier frequency offset based on the first and second sequence information of the original IQ signal pair (DIQ_in) to obtain a sampling control signal and a carrier compensation signal.

The synchronization adjustor 14 is for receiving the original IQ signal pair (DIQ_in) and a boundary indication signal, and is coupled to the synchronization estimator 13 for receiving the sampling control signal therefrom. The synchronization adjustor 14 adjusts a start boundary of the short training field of the original IQ signal pair (DIQ_in) based on the boundary indication signal, and performs sampling frequency offset compensation upon the original IQ signal pair (DIQ_in) based on the sampling control signal, so as to obtain an IQ signal pair (DIQ_1). In this embodiment, the synchronization adjustor 14 is a circuit that performs interpolation operations (e.g., a cubic B-spline interpolator).

The voltage offset estimator 111 is coupled to the synchronization adjustor 14 for receiving therefrom a portion of the IQ signal pair (DIQ_1) that corresponds to the first sequence information, and estimates the DC voltage offset of the wireless receiver based on Golay code characteristics of the portion of the IQ signal pair (DIQ_1) to obtain first compensation information. In this embodiment, the first compensation information contains an in-phase DC voltage offset value and a quadrature-phase DC voltage offset value; and the voltage offset estimator 111 averages in-phase samples of the portion of the IQ signal pair (DIQ_1) to obtain the in-phase DC voltage offset value, and averages quadrature-phase samples of the portion of the IQ signal pair (DIQ_1) to obtain the quadrature-phase DC voltage offset value.

The voltage offset compensator 112 is coupled to the synchronization adjustor 14 and the voltage offset estimator 111 for receiving the IQ signal pair (DIQ_1) and the first compensation information respectively therefrom, and performs DC voltage offset compensation upon the IQ signal pair (DIQ_1) based on the first compensation information to obtain a first intermediate IQ signal pair (DIQ_2). In this embodiment, the voltage offset compensator 112 subtracts the in-phase DC voltage offset value from each in-phase sample of the IQ signal pair (DIQ_1), and subtracts the quadrature-phase DC voltage offset value from each quadrature-phase sample of the IQ signal pair (DIQ_1), so as to obtain the first intermediate IQ signal pair (DIQ_2).

The IQ mismatch estimator 121 is coupled to the voltage offset compensator 112 for receiving therefrom a portion of the first intermediate IQ signal pair (DIQ_2) that corresponds to the second sequence information, and estimates the frequency-independent IQ mismatch of the wireless receiver based on Golay code characteristics of the portion of the first intermediate IQ signal pair (DIQ_2) to obtain second compensation information. The second compensation information cooperates with the first compensation information to constitute the result of the estimation performed by the estimation and compensation circuit 1. In this embodiment, the second compensation information contains a compensation matrix (M). The IQ mismatch estimator 121 sequentially receives IQ sample pairs ($r_I[n]$, $r_Q[n]$) of the portion of the first intermediate IQ signal pair (DIQ_2), where $D \leq n \leq D+2 \cdot L-1$, D is a start point of the portion of the first intermediate IQ signal pair (DIQ_2), and $2 \cdot L$ is a length of the portion of the first intermediate IQ signal pair (DIQ_2). The IQ mismatch estimator 121 calculates an in-phase autocorrelation value (a), a quadrature-phase autocorrelation value (b) and an IQ cross-correlation value (c) based on the in-phase samples ($r_I[n]$) and the quadrature-phase samples ($r_Q[n]$) according to the following equations:

$$a = \sum_{n=D}^{D+2 \cdot L-1} r_I^2[n], \qquad \text{Equation 1}$$

-continued $$b = \sum_{n=D}^{D+2\cdot L-1} r_Q^2[n], \text{ and} \quad \text{Equation 2}$$

$$c = -\sum_{n=D}^{D+2\cdot L-1} (r_I[n] \cdot r_Q[n]). \quad \text{Equation 3}$$

The IQ mismatch estimator 121 calculates the compensation matrix (M) based on the in-phase autocorrelation value (a), the quadrature-phase autocorrelation value (b) and the IQ cross-correlation value (c) according to the following equations:

$$\varepsilon = 1 - \frac{2}{1+\sqrt{\frac{a}{b}}} \quad \text{Equation 4}$$

$$\theta = \frac{1}{2} \cdot \sin^{-1}\frac{c}{\sqrt{a \cdot b}}, \text{ and} \quad \text{Equation 5}$$

$$M = \begin{bmatrix} C_{11} & C_{12} \\ C_{21} & C_{22} \end{bmatrix} = \frac{1}{\cos(2\cdot\theta)} \cdot \begin{bmatrix} \frac{\cos\theta}{1+\varepsilon} & \frac{\sin\theta}{1-\varepsilon} \\ \frac{\sin\theta}{1+\varepsilon} & \frac{\cos\theta}{1-\varepsilon} \end{bmatrix}, \quad \text{Equation 6}$$

where $\varepsilon$ is a gain mismatch value, and $\theta$ is a phase mismatch value.

The IQ mismatch compensator 122 is coupled to the voltage offset compensator 112 and the IQ mismatch estimator 121 for receiving the first intermediate IQ signal pair (DIQ_2) and the second compensation information respectively therefrom, and performs frequency-independent IQ mismatch compensation upon the first intermediate IQ signal pair (DIQ_2) based on the second compensation information to obtain an IQ signal pair (DIQ_3). In this embodiment, the IQ mismatch compensator 122 multiplies each IQ sample pair of the first intermediate IQ signal pair (DIQ_2) by the compensation matrix (M) to obtain the IQ signal pair (DIQ_3).

The frequency offset compensator 15 is coupled to the synchronization estimator 13 and the IQ mismatch compensator 122 for receiving the carrier compensation signal and the IQ signal pair (DIQ_3) respectively therefrom, and performs carrier frequency offset compensation upon the IQ signal pair (DIQ_3) based on the carrier compensation signal to obtain the compensated IQ signal pair (DIQ_4). In this embodiment, the frequency offset compensator 15 is a cumulative phase derotator (e.g., a CORDIC-based derotator).

The boundary detector 16 is coupled to the frequency offset compensator 15 for receiving the compensated IQ signal pair (DIQ_4) therefrom, and is further coupled to the synchronization adjustor 14. The boundary detector 16 calculates autocorrelation of a portion of the compensated IQ signal pair (DIQ_4) that corresponds to a start portion of the first sequence information, and determines the start boundary of the short training field based on a peak value of the autocorrelation to obtain the boundary indication signal for receipt by the synchronization adjustor 14, thereby enhancing accuracy of estimation of various non-ideal effects.

The channel estimation and equalization circuit 2 is coupled to the frequency offset compensator 15 for receiving the compensated IQ signal pair (DIQ_4) therefrom, performs channel estimation based on Golay code characteristics of a portion of the compensated IQ signal pair (DIQ_4) that corresponds to the fourth sequence information, and performs channel equalization compensation upon the compensated IQ signal pair (DIQ_4) based on a result of the channel estimation (e.g., channel impulse response) to obtain an equalized IQ signal pair (DIQ_5). In this embodiment, the channel estimation is performed in time domain, and the channel equalization compensation is performed in frequency domain. Therefore, the compensated IQ signal pair (DIQ_4) and the result of the channel estimation are transformed from the time domain into the frequency domain through Fast Fourier Transform, and then are processed in the frequency domain; and a result of the channel equalization compensation is transformed from the frequency domain into the time domain through Inverse Fast Fourier Transform to obtain the equalized IQ signal pair (DIQ_5).

Figure 4:
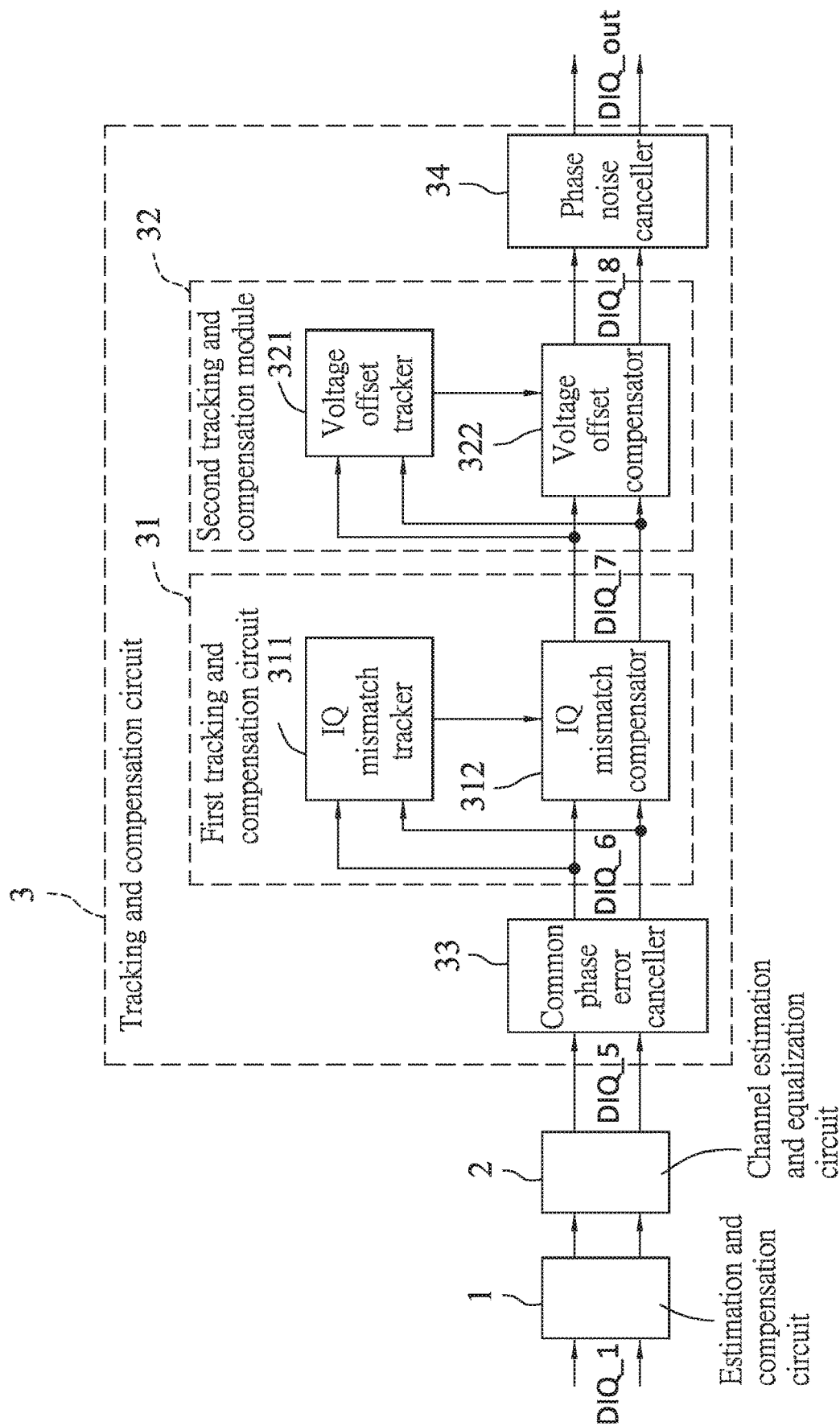
FIG. 4 is a block diagram illustrating a tracking and compensation circuit of the embodiment.

Referring to FIG. 4, the tracking and compensation circuit 3 is coupled to the channel estimation and equalization circuit 2 for receiving the equalized IQ signal pair (DIQ_5) therefrom, obtains a result of tracking of residual quantities of the frequency-independent non-ideal effects based on a portion of the equalized IQ signal pair (DIQ_5) that corresponds to the third sequence information, and compensates the equalized IQ signal pair (DIQ_5) based on the result of the tracking to obtain the output IQ signal pair (DIQ_out). The residual quantities of the frequency-independent non-ideal effects includes residual quantities of the DC voltage offset and the frequency-independent IQ mismatch of the wireless receiver, and DC voltage offset and frequency-independent IQ mismatch of the wireless transmitter.

In this embodiment, the tracking and compensation circuit 3 includes a first tracking and compensation module 31, a second tracking and compensation module 32, a common phase error canceller 33 and a phase noise canceller 34. The first tracking and compensation module 31 includes an IQ mismatch tracker 311 and an IQ mismatch compensator 312. The second tracking and compensation module 32 includes a voltage offset tracker 321 and a voltage offset compensator 322.

The common phase error canceller 33 is coupled to the channel estimation and equalization circuit 2 for receiving the equalized IQ signal pair (DIQ_5) therefrom, estimates common phase error based on a portion of the equalized IQ signal pair (DIQ_5) that corresponds to some of the first to fourth sequence information (e.g., the first, second and fourth sequence information), and performs common phase error compensation upon the equalized IQ signal pair (DIQ_5) based on a result of the estimation to obtain an IQ signal pair (DIQ_6).

The IQ mismatch tracker 311 is coupled to the common phase error canceller 33 for receiving therefrom a portion of the IQ signal pair (DIQ_6) that corresponds to the third sequence information, and continuously tracks the residual quantity of the frequency-independent IQ mismatch (including the frequency-independent IQ mismatch of the wireless transmitter and the residual quantity of the frequency-independent IQ mismatch of the wireless receiver) based on Golay code characteristics of the portion of the IQ signal pair (DIQ_6) to periodically generate third compensation information. In this embodiment, the third compensation information includes a compensation matrix (M') with four elements ($C_{11}'$, $C_{12}'$, $C_{21}'$, $C_{22}'$).

The IQ mismatch compensator 312 is coupled to the common phase error canceller 33 and the IQ mismatch tracker 311 for receiving the IQ signal pair (DIQ_6) and the third compensation information respectively therefrom, and compensates the IQ signal pair (DIQ_6) based on the third compensation information to obtain a second intermediate IQ signal pair (DIQ_7).

It should be noted that the tracking and the compensation performed by the first tracking and compensation module 31 are similar to the estimation and the compensation performed by the second estimation and compensation module 12 (see FIG. 3), and differ from the estimation and the compensation performed by the second estimation and compensation module 12 (see FIG. 3) in that, for the frame, the second compensation information is calculated once and remains unchanged thereafter, but the third compensation information is calculated multiple times (i.e., being updated periodically) so that the residual quantity of the frequency-independent IQ mismatch, which is time varying, can be cancelled.

It should also be noted that, in this embodiment, each of the IQ mismatch estimator 121 (see FIG. 3) and the IQ mismatch tracker 311 uses its own hardware to perform the estimation or the tracking. Since the estimation performed by the IQ mismatch estimator 121 (see FIG. 3) and the tracking performed by the IQ mismatch tracker 311 are similar, but happen at different times, in a modification of this embodiment, the estimation and the tracking can be performed by the same hardware with a sufficiently large bit width. For example, the IQ mismatch tracker 311 is omitted; and the IQ mismatch estimator 121 (see FIG. 3) is further coupled to the common phase error canceller 33 and the IQ mismatch compensator 312, is for receiving the portion of the IQ signal pair (DIQ_6) that corresponds to the third sequence information from the common phase error canceller 33, and tracks the residual quantity of the frequency-independent IQ mismatch based on the Golay code characteristics of the portion of the IQ signal pair (DIQ_6) to obtain the third compensation information for receipt by the IQ mismatch compensator 312.

The voltage offset tracker 321 is coupled to the IQ mismatch compensator 312 for receiving therefrom a portion of the second intermediate IQ signal pair (DIQ_7) that corresponds to the third sequence information, and continuously tracks the residual quantity of the DC voltage offset (including the DC voltage offset of the wireless transmitter and the residual quantity of the DC voltage offset of the wireless receiver) based on Golay code characteristics of the portion of the second intermediate IQ signal pair (DIQ_7) to periodically generate fourth compensation information. The fourth compensation information cooperates with the third compensation information to constitute the result of the tracking performed by the tracking and compensation circuit 3. In this embodiment, the fourth compensation information includes an in-phase DC voltage offset value and a quadrature-phase DC voltage offset value.

The voltage offset compensator 322 is coupled to the IQ mismatch compensator 312 and the voltage offset tracker 321 for receiving the second intermediate IQ signal pair (DIQ_7) and the fourth compensation information respectively therefrom, and compensates the second intermediate IQ signal pair (DIQ_7) based on the fourth compensation information to obtain an IQ signal pair (DIQ_8).

It should be noted that the tracking and the compensation performed by the second tracking and compensation module 32 is similar to the estimation and the compensation performed by the first estimation and compensation module 11 (see FIG. 3), and differ from the estimation and the compensation performed by the first estimation and compensation module 11 (see FIG. 3) in that, for the frame, the first compensation information is calculated once and remains unchanged thereafter, but the fourth compensation information is calculated multiple times (i.e., being updated periodically) so that the residual quantity of the DC voltage offset, which is time varying, can be cancelled.

It should also be noted that, in this embodiment, each of the voltage offset estimator 111 (see FIG. 3) and the voltage offset tracker 321 uses its own hardware to perform the estimation or the tracking. Since the estimation performed by the voltage offset estimator 111 (see FIG. 3) and the tracking performed by the voltage offset tracker 321 are similar, but happen at different times, in the aforesaid modification of this embodiment, the estimation and the tracking can be performed by the same hardware with a sufficiently large bit width. For example, the voltage offset tracker 321 is omitted; and the voltage offset estimator 111 (see FIG. 3) is further coupled to the IQ mismatch compensator 312 and the voltage offset compensator 322, is for receiving the portion of the second intermediate IQ signal pair (DIQ_7) that corresponds to the third sequence information from the IQ mismatch compensator 312, and tracks the residual quantity of the DC voltage offset based on the Golay code characteristics of the portion of the second intermediate IQ signal pair (DIQ_7) to obtain the fourth compensation information for receipt by the voltage offset compensator 322.

The phase noise canceller 34 is coupled to the voltage offset compensator 322 for receiving the IQ signal pair (DIQ_8) therefrom, and performs phase noise estimation and compensation based on the IQ signal pair (DIQ_8) to obtain the output IQ signal pair (DIQ_out). It should be noted that the common phase error estimation and the common phase error compensation performed by the common phase error canceller 33 includes phase noise estimation and phase noise compensation, so the phase noise estimation and the phase noise compensation performed by the phase noise canceller 34 is to estimate and cancel a residual quantity of the phase noise.

Figure 5:
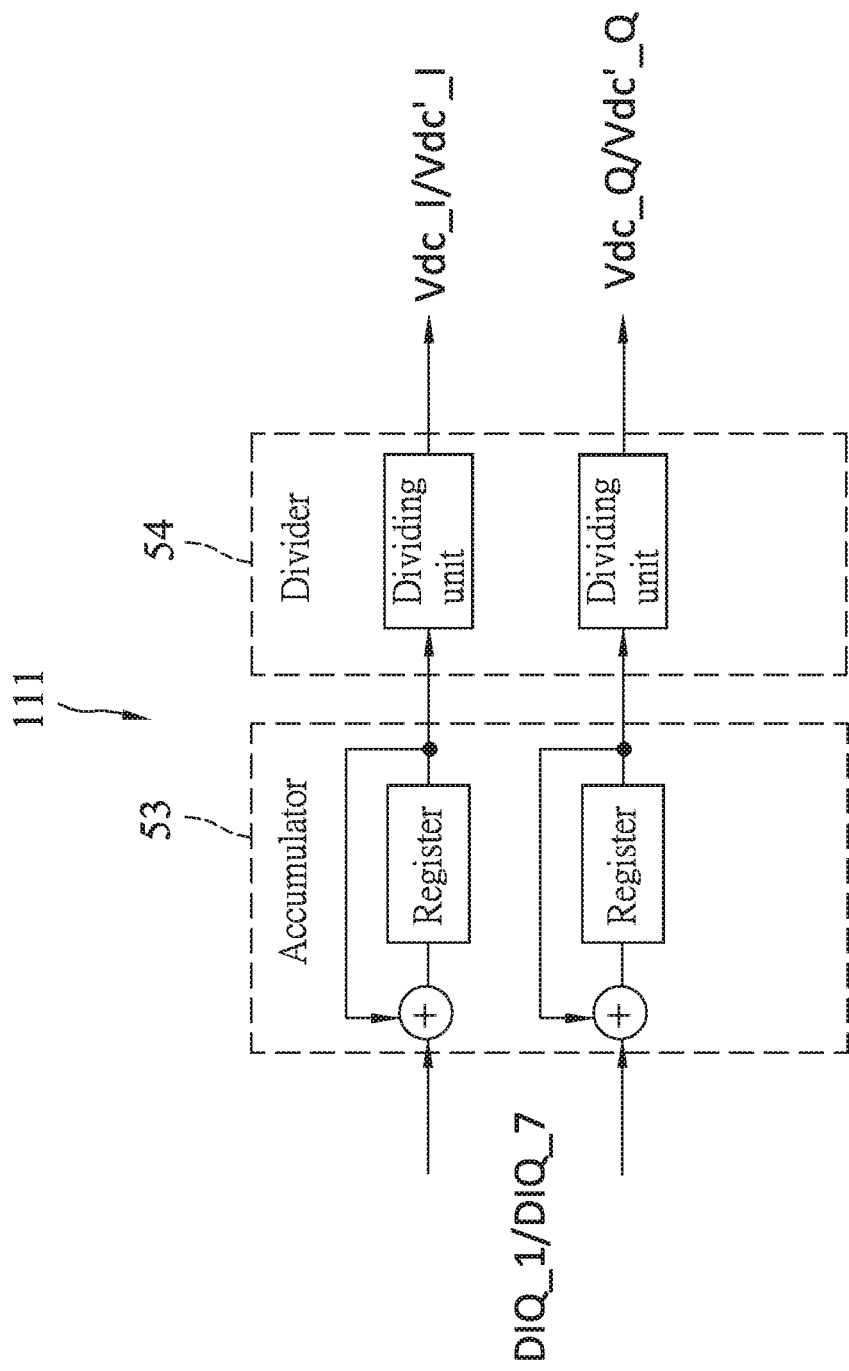
FIG. 5 is a circuit diagram illustrating a voltage offset estimator of the estimation and compensation circuit of a modification of the embodiment.

FIG. 5 illustrates an implementation of the voltage offset estimator 111 of the aforesaid modification of this embodiment. In this implementation, the voltage offset estimator 111 includes an accumulator 53 and a divider 54 coupled to the accumulator 53, and is operable in two states including a first state and a second state. When the voltage offset estimator 111 operates in the first state, the in-phase samples of the portion of the IQ signal pair (DIQ_1) that corresponds to the first sequence information are accumulated by the accumulator 53 and then divided by the divider 54 so as to obtain the in-phase DC voltage offset value (Vdc_I) of the first compensation information; and the quadrature-phase samples of the portion of the IQ signal pair (DIQ_1) are accumulated by the accumulator 53 and then divided by the divider 54 so as to obtain the quadrature-phase DC voltage offset value (Vdc_Q) of the first compensation information. When the voltage offset estimator 111 operates in the second state, in-phase samples of the portion of the second intermediate IQ signal pair (DIQ_7) that corresponds to the third sequence information are accumulated by the accumulator 53 and then divided by the divider 54 so as to obtain the in-phase DC voltage offset value (Vdc'_I) of the fourth compensation information; and quadrature-phase samples of the portion of the second intermediate IQ signal pair (DIQ_7) are accumulated by the accumulator 53 and then divided by the divider 54 so as to obtain the quadrature-phase DC voltage offset value (Vdc'_Q) of the fourth compensation information.

Figure 6:
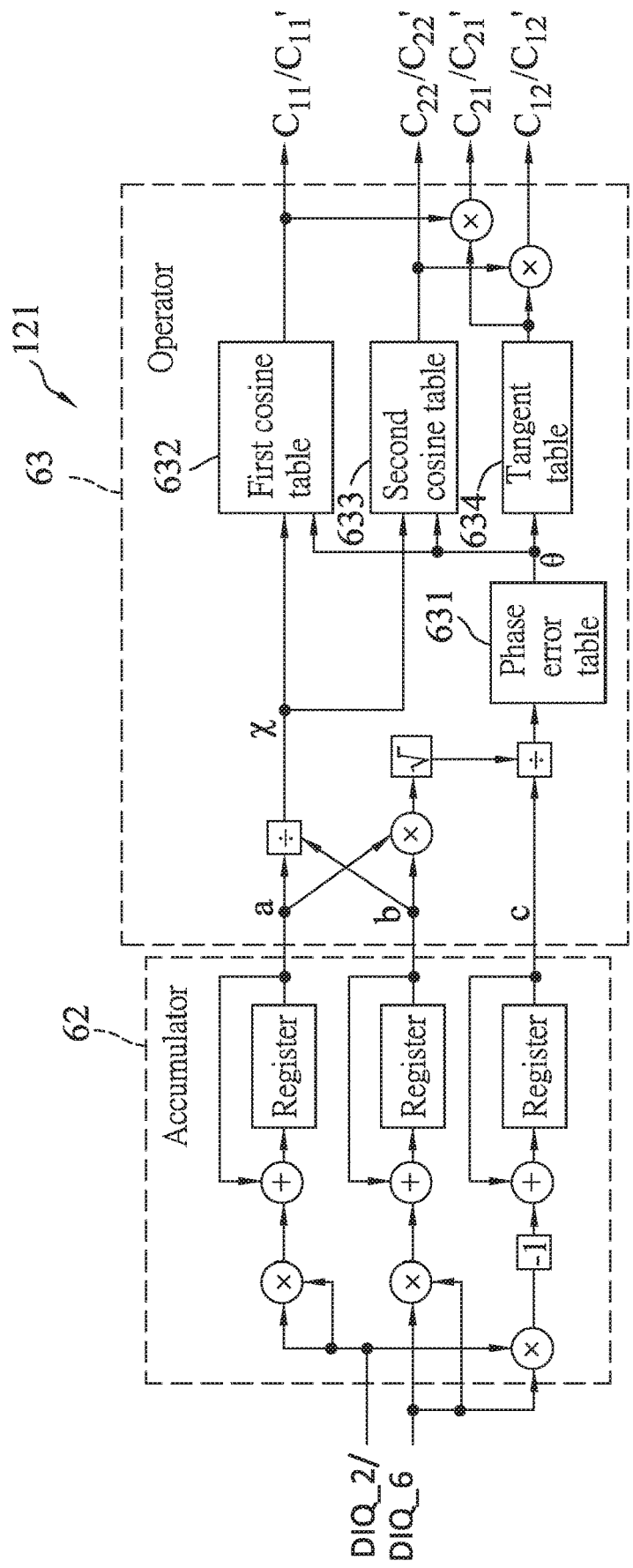
FIG. 6 is a circuit diagram illustrating an IQ mismatch estimator of the estimation and compensation circuit of the modification of the embodiment.

FIG. 6 illustrates an implementation of the IQ mismatch estimator 121 of the aforesaid modification of this embodiment. In this implementation, the IQ mismatch estimator 121 includes an accumulator 62 and an operator 63 coupled to the accumulator 62, and is operable in two states including a first state and a second state. When the IQ mismatch estimator 121 operates in the first state, the accumulator 32 is for receiving the portion of the first intermediate IQ signal pair (DIQ_2) that corresponds to the second sequence information, and performs accumulation operations expressed by Equations 1-3 based on the portion of the first intermediate IQ signal pair (DIQ_2) to obtain an accumulation output that includes the in-phase autocorrelation value (a), the quadrature-phase autocorrelation value (b) and the IQ cross-correlation value (c); and the operators 632 is for receiving the accumulation output from the accumulator 62, and calculates the elements ($C_{11}$, $C_{12}$, $C_{21}$, $C_{22}$) of the compensation matrix (M) of the second compensation information based on the accumulation output according to Equations 4-6. When the IQ mismatch estimator 121 operates in the second state, the accumulator 32 is for receiving the portion of the IQ signal pair (DIQ_6) that corresponds to the third sequence information, and performs the accumulation operations expressed by Equations 1-3 based on the portion of the IQ signal pair (DIQ_6) to obtain the accumulation output that includes the in-phase autocorrelation value (a), the quadrature-phase autocorrelation value (b) and the IQ cross-correlation value (c); and the operators 632 is for receiving the accumulation output from the accumulator 62, and calculates the elements ($C_{11}'$, $C_{12}'$, $C_{21}'$, $C_{22}'$) of the compensation matrix (M') of the third compensation information based on the accumulation output according to Equations 4-6. In particular, the operator 63 stores four lookup tables 631-634 that includes a phase error table 631, a first cosine table 632, a second cosine table 633 and a tangent table 634. The lookup tables 631-634 assist in calculating the elements ($C_{11}/C_{11}'$, $C_{12}/C_{12}'$, $C_{21}/C_{21}'$, $C_{22}/C_{22}'$) of the compensation matrix (M/M'). The phase error table 631 is used to map an intermediate value of $$\frac{c}{\sqrt{a \cdot b}}$$

into the phase mismatch value (θ). The first cosine table 632 is used to map a combination of another intermediate value (χ) of $$\frac{a}{b}$$

and the phase mismatch value (θ) into the element ($C_{11}/C_{11}'$) that is equal to $$\frac{\cos\theta}{\cos(2\cdot\theta)\cdot\left(2 - \frac{2}{1+\sqrt{\chi}}\right)}.$$

The second cosine table 633 is used to map the combination of the intermediate value (χ) and the phase mismatch value (θ) into the element ($C_{22}/C_{22}'$) that is equal to $$\frac{\cos\theta}{\cos(2\cdot\theta)\cdot\left(\frac{2}{1+\sqrt{\chi}}\right)}.$$

The tangent table 634 is used to map the phase mismatch value (θ) into a tangent value that is equal to tan θ. The element ($C_{12}/C_{12}'$) is obtained through multiplying the element ($C_{22}/C_{22}'$) by the tangent value. The element ($C_{21}/C_{21}'$) is obtained through multiplying the element ($C_{11}/C_{11}'$) by the tangent value.

It should be noted that a plurality of dividers, each with a large bit width, are required when the computations replaced by the lookup tables 631-634 are performed directly. Each of the dividers has high hardware complexity (requiring a large amount of logic gates), so it occupies a large area, and may not complete the computation in a predetermined time period when the baseband system operates at a high clock rate (e.g., 625 MHz). In the aforesaid modification of this embodiment, since the operator 63 obtains the elements ($C_{11}/C_{11}'$, $C_{12}/C_{12}'$, $C_{21}/C_{21}'$, $C_{22}/C_{22}'$) by using the lookup tables 631-634, instead of by directly performing the computations, an area occupied by the baseband system can be reduced, a clock rate at which the baseband system operates can be increased, and power consumption of the baseband system can be reduced.

Figure 7:
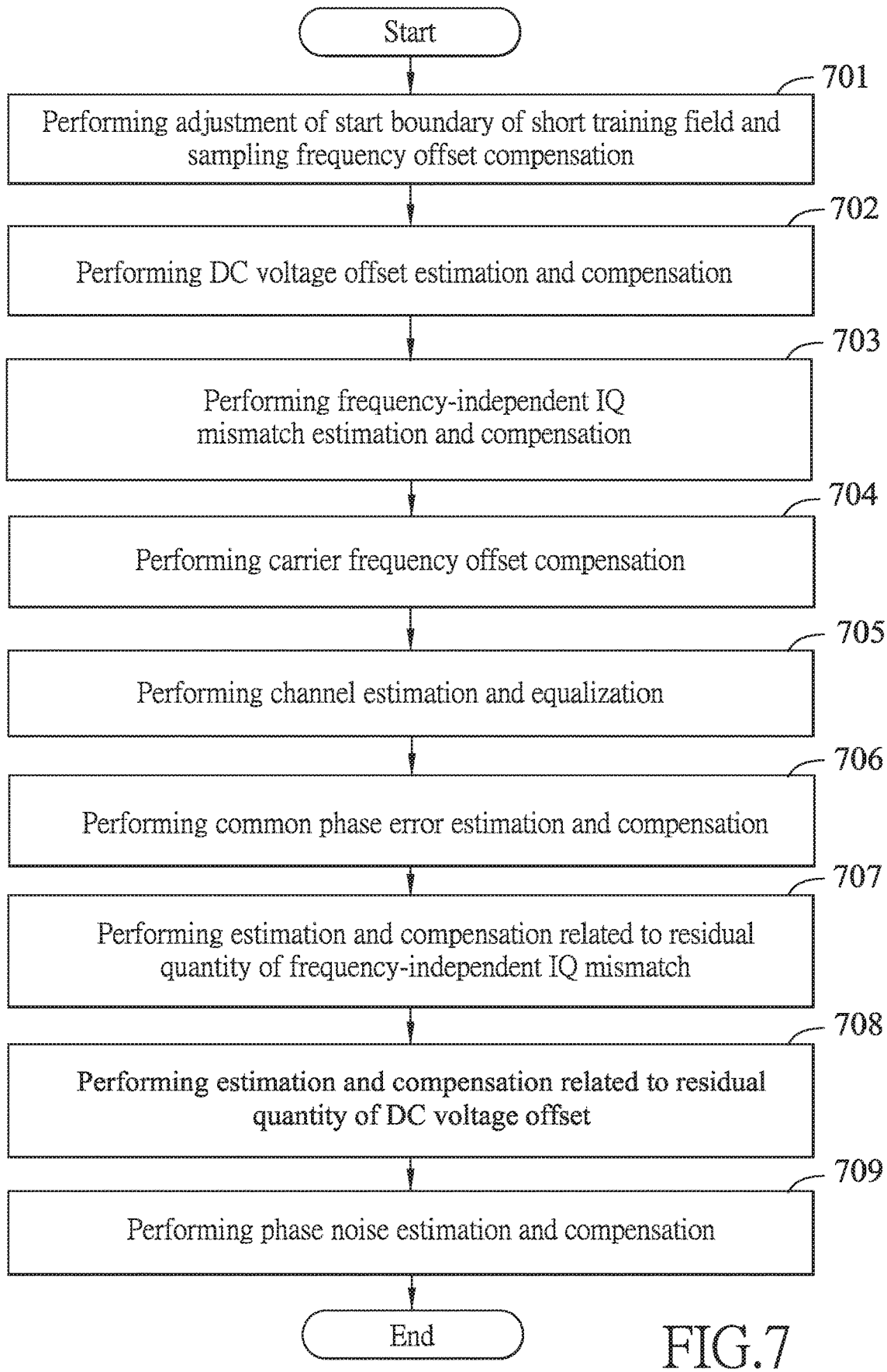
FIG. 7 is a flow chart illustrating a baseband signal processing method performed by the embodiment.

Referring to FIGS. 3, 4 and 7, a baseband signal processing method performed by the baseband system of this embodiment includes the following steps 701-709.

In step 701, the synchronization adjustor 14 performs the adjustment of the start boundary of the short training field and the sampling frequency offset compensation upon the original IQ signal pair (DIQ_in) to obtain the IQ signal pair (DIQ_1).

In step 702, the first estimation and compensation module 11 performs the DC voltage offset estimation and compensation based on the IQ signal pair (DIQ_1) to obtain the first intermediate IQ signal pair (DIQ_2).

In step 703, the second estimation and compensation module 12 performs the frequency-independent IQ mismatch estimation and compensation based on the first intermediate IQ signal pair (DIQ_2) to obtain the IQ signal pair (DIQ_3).

In step 704, the frequency offset compensator 15 performs the carrier frequency offset compensation upon the IQ signal pair (DIQ_3) to obtain the compensated IQ signal pair (DIQ_4).

In step 705, the channel estimation and equalization circuit 2 performs the channel estimation and equalization based on the compensated IQ signal pair (DIQ_4) to obtain the equalized IQ signal pair (DIQ_5).

In step 706, the common phase error canceller 33 performs the common phase error estimation and compensation based on the equalized IQ signal pair (DIQ_5) to obtain the IQ signal pair (DIQ_6).

In step 707, the first tracking and compensation module 31 performs the estimation and the compensation related to the residual quantity of the frequency-independent IQ mismatch based on the IQ signal pair (DIQ_6) to obtain the second intermediated IQ signal pair (DIQ_7).

In step 708, the second tracking and compensation module 32 performs the estimation and the compensation related to the residual quantity of the DC voltage offset based on the second intermediated IQ signal pair (DIQ_7) to obtain the IQ signal pair (DIQ_8).

In step 709, the phase noise canceller 34 performs the phase noise estimation and the phase noise compensation based on the IQ signal pair (DIQ_8) to obtain the output IQ signal pair (DIQ_out).

In view of the above, in this embodiment, the baseband system can perform the estimation and the compensation related to the frequency-independent non-ideal effects and the tracking and the compensation related to the residual quantities of the frequency-independent non-ideal effects when the wireless transmitter and the wireless receiver are online, so no extra offline calibration time is required and receipt performance of the wireless receiver can be effectively increased.

In addition, in the aforesaid modification of this embodiment, since the voltage offset estimator 111 (see FIG. 5) estimates the DC voltage offset and tracks the residual quantity of the DC voltage offset at different times, and since the IQ mismatch estimator 121 (see FIG. 6) estimates the frequency-independent IQ mismatch and tracks the residual quantity of the frequency-independent IQ mismatch at different times, hardware resources of the baseband system can be saved and hardware costs of the baseband system can be reduced as compared to this embodiment.

Moreover, in the aforesaid modification of this embodiment, since four lookup tables 631-634 (see FIG. 6) are used to replace a plurality of computation units with high hardware complexity (e.g., dividers), the clock rate at which the baseband system operates can be increased, and the hardware costs of the baseband system can be further reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A baseband system to be used in a wireless receiver for processing an original in-phase and quadrature-phase (IQ) signal pair that contains first sequence information, second sequence information and third sequence information, said baseband system comprising:
    an estimation and compensation circuit for receiving the original IQ signal pair, estimating frequency-independent non-ideal effects based on the first and second sequence information of the original IQ signal pair, and compensating the original IQ signal pair based on a result of the estimation to obtain a compensated IQ signal pair;
    a channel estimation and equalization circuit coupled to said estimation and compensation circuit for receiving the compensated IQ signal pair, and performing channel estimation and equalization based on the compensated IQ signal pair to obtain an equalized IQ signal pair; and
    a tracking and compensation circuit coupled to said channel estimation and equalization circuit for receiving the equalized IQ signal pair, obtaining a result of tracking of residual quantities of the frequency-independent non-ideal effects based on a portion of the equalized IQ signal pair that corresponds to the third sequence information, and compensating the equalized IQ signal pair based on the result of the tracking to obtain an output IQ signal pair.

2. The baseband system of claim 1, the frequency-independent non-ideal effects including direct current (DC) voltage offset and frequency-independent IQ mismatch, wherein said estimation and compensation circuit includes:
    a first estimating and compensating circuit for receiving the original IQ signal pair, estimating the DC voltage offset based on the first sequence of the original IQ signal pair to obtain first compensation information, and compensating the original IQ signal pair based on the first compensation information to obtain a first intermediate IQ signal pair; and
    a second estimating and compensating circuit coupled to said first estimating and compensating circuit for receiving the first intermediate IQ signal pair, further coupled to said channel estimation and equalization circuit, estimating the frequency-independent IQ mismatch based on a portion of the first intermediate IQ signal pair, which corresponds to the second sequence information, to obtain second compensation information, and compensating the first intermediate IQ signal pair based on the second compensation information to obtain the compensated IQ signal pair for receipt by said channel estimation and equalization circuit.

3. The baseband system of claim 2, wherein the first compensation information contains an in-phase DC voltage offset value and a quadrature-phase DC voltage offset value.

4. The baseband system of claim 3, wherein said first estimating and compensating circuit subtracts the in-phase DC voltage offset value from each in-phase sample of the original IQ signal pair, and subtracts the quadrature-phase DC voltage offset value from each quadrature-phase sample of the original IQ signal pair, so as to obtain the first intermediate IQ signal pair.

5. The baseband system of claim 2, wherein the second compensation information contains a compensation matrix.

6. The baseband system of claim 5, wherein said second estimating and compensating circuit multiplies each IQ sample pair of the first intermediate IQ signal pair by the compensation matrix to obtain the compensated IQ signal pair.

7. The baseband system of claim 5, wherein said second estimating and compensating circuit includes:
    an accumulator for receiving the portion of the first intermediate IQ signal pair that corresponds to the second sequence information, and performing accumulation operations based on the portion of the first intermediate IQ signal pair to obtain an accumulation output; and
    an operator coupled to said accumulator for receiving the accumulation output, and calculating the compensation matrix based on the accumulation output.

8. The baseband system of claim 7, wherein said operator stores a plurality of lookup tables that assist in calculating the compensation matrix.

9. The baseband system of claim 1, the frequency-independent non-ideal effects including DC voltage offset and frequency-independent IQ mismatch, wherein said tracking and compensation circuit includes:
  a first tracking and compensating circuit coupled to said channel estimation and equalization circuit for receiving the equalized IQ signal pair, obtaining, based on the portion of the equalized IQ signal pair that corresponds to the third sequence information, third compensation information that is related to the tracking of the residual quantity of the frequency-independent IQ mismatch, and compensating the equalized IQ signal pair based on the third compensation information to obtain a second intermediate IQ signal pair; and
  a second tracking and compensating circuit coupled to said first tracking and compensating circuit for receiving the second intermediate IQ signal pair, obtaining, based on a portion of the second intermediate IQ signal pair that corresponds to the third sequence information, fourth compensation information that is related to the tracking of the residual quantity of the DC voltage offset, and compensating the second intermediate IQ signal pair based on the fourth compensation information to obtain the output IQ signal pair.

10. The baseband system of claim 9, wherein said estimation and compensation circuit is further coupled to said first tracking and compensating circuit for receiving, from said channel estimation and equalization circuit, the portion of the equalized IQ signal pair that corresponds to the third sequence information, and tracking the residual quantity of the frequency-independent IQ mismatch based on the portion of the equalized IQ signal pair to obtain the third compensation information for receipt by said first tracking and compensating circuit.

11. The baseband system of claim 1, wherein the first and second sequence information has Golay code characteristics, wherein said estimation and compensation circuit estimates the frequency-independent non-ideal effects based on the Golay code characteristics of the first and second sequence information.

12. The baseband system of claim 1, wherein the third sequence information has Golay code characteristics, wherein the tracking of the residual quantities of the frequency-independent non-ideal effects is performed based on the Golay code characteristics of the portion of the equalized IQ signal pair that corresponds to the third sequence information.

13. A baseband signal processing method to be implemented by a baseband system of a wireless receiver for processing an original in-phase and quadrature-phase (IQ) signal pair that contains first sequence information, second sequence information and third sequence information, said baseband signal processing method comprising:
  estimating frequency-independent non-ideal effects based on the first and second sequence information of the original IQ signal pair, and compensating the original IQ signal pair based on a result of the estimation to obtain a compensated IQ signal pair;
  performing channel estimation and equalization based on the compensated IQ signal pair to obtain an equalized IQ signal pair; and
  obtaining a result of tracking of residual quantities of the frequency-independent non-ideal effects based on a portion of the equalized IQ signal pair that corresponds to the third sequence information, and compensating the equalized IQ signal pair based on the result of the tracking to obtain an output IQ signal pair.

* * * * *